US012105398B2

(12) United States Patent
Ozaki et al.

(10) Patent No.: US 12,105,398 B2
(45) Date of Patent: Oct. 1, 2024

(54) SEMICONDUCTOR MACH-ZEHNDER OPTICAL MODULATOR AND IQ MODULATOR

(71) Applicant: Nippon Telegraph and Telephone Corporation, Tokyo (JP)

(72) Inventors: Josuke Ozaki, Tokyo (JP); Shigeru Kanazawa, Tokyo (JP); Yoshihiro Ogiso, Tokyo (JP); Hiromasa Tanobe, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 450 days.

(21) Appl. No.: 17/429,005

(22) PCT Filed: Feb. 14, 2019

(86) PCT No.: PCT/JP2019/005235
§ 371 (c)(1),
(2) Date: Aug. 6, 2021

(87) PCT Pub. No.: WO2020/165986
PCT Pub. Date: Aug. 20, 2020

(65) Prior Publication Data
US 2022/0066281 A1    Mar. 3, 2022

(51) Int. Cl.
*G02F 1/225*    (2006.01)
*G02F 1/21*    (2006.01)
(52) U.S. Cl.
CPC ............ *G02F 1/2257* (2013.01); *G02F 1/212* (2021.01)

(58) Field of Classification Search
CPC ..... G02B 6/2813; G02F 1/212; G02F 1/2255; G02F 1/2257
See application file for complete search history.

(56) References Cited

U.S. PATENT DOCUMENTS 8,086,078 B2    12/2011    Sugiyama
2010/0067840 A1*    3/2010    Sugiyama ............. G02F 1/0356
385/2

(Continued)

FOREIGN PATENT DOCUMENTS

JP    2010072129 A    4/2010
JP    2012078496 A    4/2012

(Continued)

OTHER PUBLICATIONS

Klein et al., "1.55 ?m Mach-Zehnder Modulators on InP for optical 40/80 Gbit/s transmission networks", OFC2006, 2006, pp. 171-173.

(Continued)

*Primary Examiner* — Michael P Mooney
(74) *Attorney, Agent, or Firm* — Slater Matsil, LLP (57) ABSTRACT

Phase modulation electrode lines of a semiconductor Mach-Zehnder optical modulator are formed along waveguides. Output-side lead lines are bent in a direction crossing the extending direction of the waveguides in the plane of a dielectric layer and are connected to terminal resistors. The output-side lead lines are formed in a predetermined width corresponding to a desired impedance and make the width narrower than the predetermined width only in the bent portions and portions where the output-side lead lines crosses the waveguides.

7 Claims, 10 Drawing Sheets

(56) References Cited

U.S. PATENT DOCUMENTS

| | | |
|---|---|---|
| 2013/0243364 A1 | 9/2013 | Kanno et al. |
| 2016/0054639 A1 | 2/2016 | Kono |
| 2020/0026145 A1 | 1/2020 | Ogiso et al. |

FOREIGN PATENT DOCUMENTS

| | | |
|---|---|---|
| JP | 2016045315 A | 4/2016 |
| JP | 2017111238 A | 6/2017 |
| WO | 2017208526 A1 | 12/2017 |
| WO | 2018174083 A1 | 9/2018 |

OTHER PUBLICATIONS

Kono et al. "Compact and Low Power DP-QPSK Modulator Module with InP-Based Modulator and Driver ICs," OFC/NFOEC Technical Digest, 2013, 3 pages.

Lange et al., "Low Power InP-Based Monolithic DFB-Laser IQ Modulator with SiGe Differential Driver for 32-GBd QPSK Modulation," Journal of Lightwave Technology, vol. 34, No. 8, Apr. 15, 2016, pp. 1678-1682.

Morl et al., "A travelling wave electrode Mach-Zehnder 40 GB/s demultiplexer based on strain compensated GaInAs/AlInAs tunnelling barrier MQW structure", 1998 International Conference on Indium Phosphide and Related Materials, May 11-15, 1998, pp. 403-406.

Prosyk et al., "Travelling Wave Mach-Zehnder Modulators," The 25th International Conference on Indium Phosphide and Related Materials, IPRM2013, May 19-23, 2013, Kobe, Japan, 2 pages.

\* cited by examiner

-- PRIOR ART --

FIG. 8B

-- PRIOR ART --

FIG. 9

-- PRIOR ART --

SEMICONDUCTOR MACH-ZEHNDER OPTICAL MODULATOR AND IQ MODULATOR

CROSS-REFERENCE TO RELATED APPLICATIONS

This application is a national phase entry of PCT Application No. PCT/JP2019/005235, filed on Feb. 14, 2019, which application is hereby incorporated herein by reference.

TECHNICAL FIELD

The present invention relates to a semiconductor Mach-Zehnder optical modulator that modulates an optical signal by an electrical signal, and an IQ modulator using the semiconductor Mach-Zehnder optical modulator.

BACKGROUND

To cope with an increasing communication traffic demand, a high-speed optical modulator compatible with an advanced optical modulation method has been required. In particular, multilevel optical modulators using a digital coherent technique have played a major role in implementing a transceiver with a large capacity more than 100 Gbps. In the multilevel optical modulators, to add independent signals to the amplitude and the phase of light, Mach-Zehnder (MZ) interference type optical modulators capable of zero chirp driving are parallelly incorporated in multiple stages.

Figure 8A:
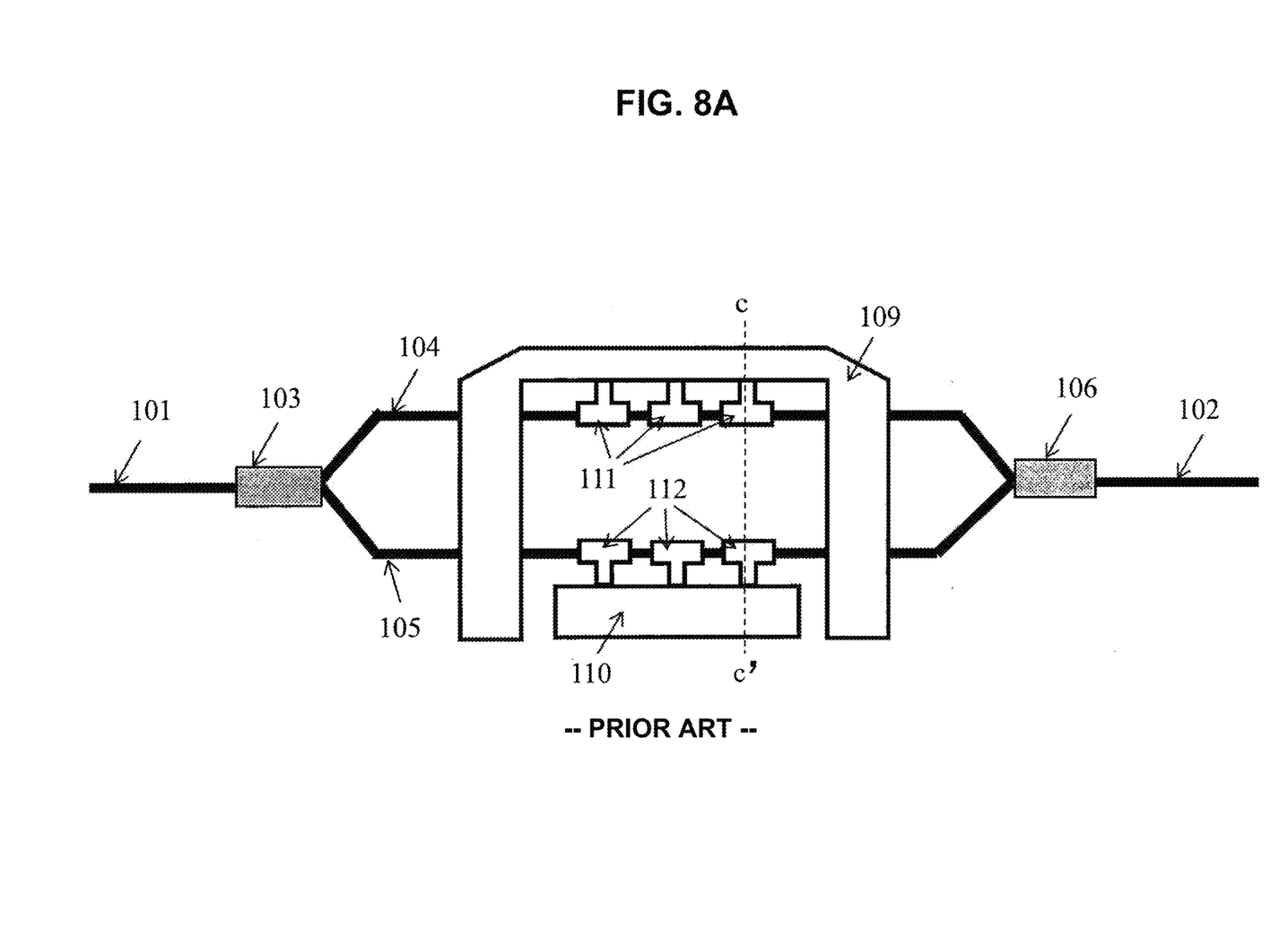
FIG. 8A is a plan view showing the configuration of a conventional semiconductor Mach-Zehnder optical modulator.
Figure 8B:
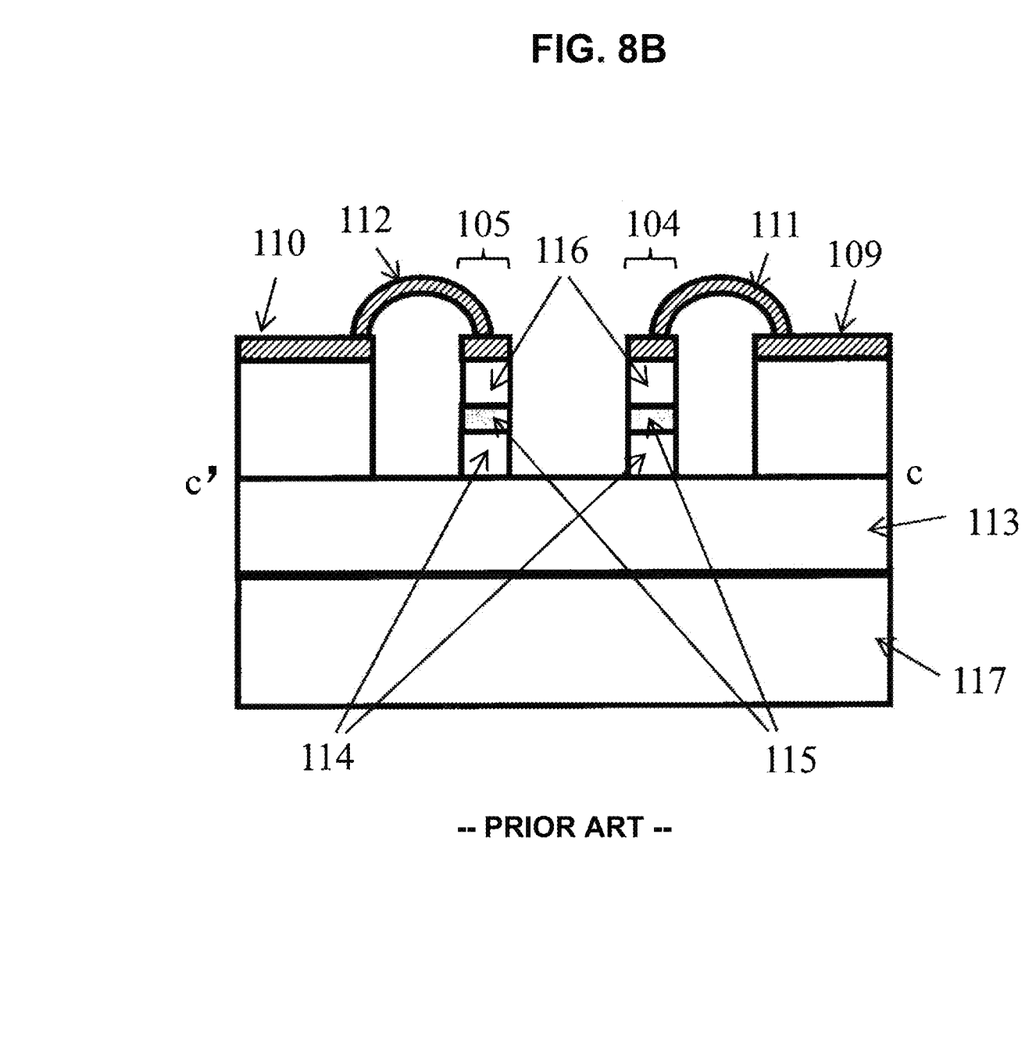
FIG. 8B is a sectional view showing the configuration of the conventional semiconductor Mach-Zehnder optical modulator.

In recent years, how to reduce the size of an optical transmitter module and how to implement a low driving voltage have become problems, and R&D on a compact semiconductor MZ optical modulator capable of lowering the driving voltage has been vigorously conducted (see non-patent literatures 1 and 2). FIGS. 8A and 8B show an example of a conventional semiconductor MZ optical modulator. FIG. 8A is a plan view of a semiconductor MZ optical modulator, and FIG. 8B is a sectional view taken along a line c-c' in FIG. 8A.

Referring to FIGS. 8A and 8B, reference numeral 101 denotes an input waveguide of a semiconductor MZ optical modulator; 102, an output waveguide; 103, an optical demultiplexer that demultiplexes an optical wave propagating through the input waveguide 101 into two waveguides 104 and 105; 106, an optical multiplexer that multiplexes the optical waves propagating through the two waveguides 104 and 105 into the output waveguide 102; 109 and 110, coplanar strip lines; and 111 and 112, electrodes configured to apply voltages to the waveguides 104 and 105.

Referring to FIG. 8B, reference numeral 113 denotes an n-InP layer; 114, a lower cladding layer made of InP; 115, a semiconductor core layer through which an optical wave propagates; 116, an upper cladding layer made of InP; and 117, an SI-InP substrate.

The input waveguide 101, the output waveguide 102, the optical demultiplexer 103, the waveguides 104 and 105, and the optical multiplexer 106 form an MZ interferometer. In the MZ interferometer, when voltages are applied to the waveguides 104 and 105, a refractive index change occurs in the semiconductor core layer 115 due to an electrooptic effect, and as a result, the phase of light changes. At this time, when a voltage difference is set between the waveguides 104 and 105, the interference state of light in the optical multiplexer 106 changes, and the light can be modulated (that is, output light from the output waveguide 102 is turned on or off).

An SG configuration is formed in which if one of the two coplanar strip lines 109 and 110 is connected to an input electrical signal (S), the other is connected to a reference potential or ground (G).

A microwave propagating through the coplanar strip lines 109 and 110 is applied to the waveguides 104 and 105 by the electrodes 111 and 112. The electrodes 111 and 112 and the coplanar strip lines 109 and 110 form a traveling wave electrode as a whole. That is, the electrode structure intends to raise the modulation band by making the speed of the optical wave propagating through the waveguides 104 and 105 match the speed of the microwave propagating through the traveling wave electrode as much as possible and implementing phase matching between the optical wave and the microwave. If a microwave loss is eliminated, and the speed matching conditions for the optical wave and the microwave are completely satisfied, the modulation band becomes infinite.

In fact, since a microwave loss, microwave reflection derived from impedance mismatching, and a phase shift between the optical wave and the microwave occur, the modulation band is limited due to these reasons.

Since the upper cladding layer 116, the semiconductor core layer 115, and the lower cladding layer 114 exist under the electrodes 111 and 112, as described above, a predetermined element capacity exists. That is, in FIG. 8A, the electrodes 111 and 112 add capacities to the coplanar strip lines 109 and 110.

That is, when the number and interval of the electrodes 111 and 112 and the contact lengths of the electrodes 111 and 112 to the waveguides 104 and 105 are optimally designed, the addition amounts of capacities to the coplanar strip lines 109 and 110 can freely be designed, and the impedances and the microwave speeds in the coplanar strip lines 109 and 110 can be designed to arbitrary values. In addition, the coplanar strip lines 109 and 110 are designed as relatively thick as 100 μm to reduce the microwave loss and implement a boarder band.

As described above, in the semiconductor MZ optical modulator with a capacity loading structure, when optimum capacity addition amounts to the coplanar strip lines 109 and 110 are designed, speed matching between the optical wave and the microwave can be improved, and impedance matching to 50Ω can be implemented. As a result, high-speed optical modulation can be performed.

The semiconductor MZ optical modulator with the configuration shown in FIGS. 8A and 8B is of single-phase driving type. However, when connection to a driver of differential driving type or power consumption is taken into consideration, the optical modulator side is also preferably formed as a differential driving type (for example, GSSG configuration) (see non-patent literature 3).

Also, the optical modulator of differential driving type is excellent in suppressing crosstalk, unlike the single-phase driving type, and is therefore advantageous in implementing a polarization multiplex IQ modulator integrated on one chip. Considering the layout of the modulator chip, to connect a signal line to a driver and a terminal resistor, the signal line needs to be bent somewhere such that the signal line reaches a chip end. However, in a case in which an optical modulator is of differential driving type, like an IQ modulator of single-phase driving type disclosed in non-patent literature 4, if a signal line of a differential configuration is bent almost at a right angle, a large phase difference is generated between two signal lines that form a differential pair, and the differential characteristic degrades, or a common mode that is a noise component is induced, and the transmission characteristic of the modulator degrades.

Figure 9:
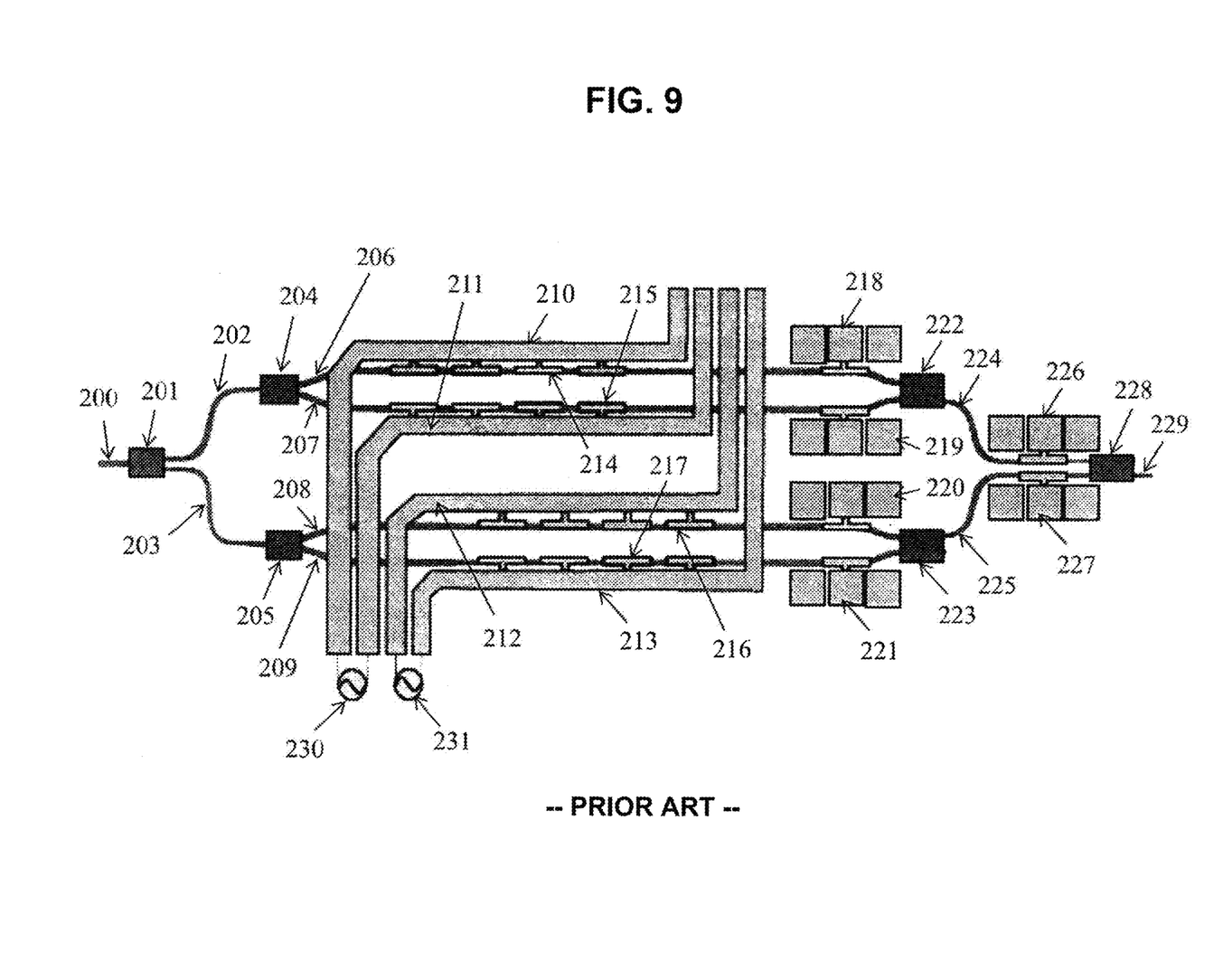
FIG. 9 is a plan view showing the configuration of a conventional single-phase driving type IQ modulator.

FIG. 9 is a plan view of a conventional single-phase driving type IQ modulator disclosed in non-patent literature 4. The single-phase driving type IQ modulator is formed by an input waveguide 200, a 1×2 multimode interference (MMI) coupler 201 that demultiplexes light propagating through the input waveguide 200 into two systems, waveguides 202 and 203 that guide the two light components demultiplexed by the 1×2 MMI coupler 201, a 1×2 MMI coupler 204 that demultiplexes the light propagating through the waveguide 202 into two systems, a 1×2 MMI coupler 205 that demultiplexes the light propagating through the waveguide 203 into two systems, waveguides 206 and 207 that guide the two light components demultiplexed by the 1×2 MMI coupler 204, waveguides 208 and 209 that guide the two light components demultiplexed by the 1×2 MMI coupler 205, signal lines 210 to 213 configured to apply voltages to the waveguides 206 to 209, electrodes 214 to 217 that apply the voltages supplied from the signal lines 210 to 213 to the waveguides 206 to 209, phase adjustment electrodes 218 to 221 configured to adjust the phases of modulated signal light components propagating through the waveguides 206 to 209, a 2×1 MMI coupler 222 that multiplexes the signal light components of two systems propagating through the waveguides 206 and 207, a 2×1 MMI coupler 223 that multiplexes the signal light components of two systems propagating through the waveguides 208 and 209, a waveguide 224 that guides output light from the 2×1 MMI coupler 222, a waveguide 225 that guides output light from the 2×1 MMI coupler 223, phase adjustment electrodes 226 and 227 configured to adjust the phases of the signal light components propagating through the waveguides 224 and 225, a 2×1 MMI coupler 228 that multiplexes the signal light components of two systems propagating through the waveguides 224 and 225, and an output waveguide 229. One-end sides of the signal lines 210 to 213 are connected to drivers 230 and 231, and the other-end sides of the signal lines 210 to 213 are connected to terminal resistors (not shown).

The reason why it is difficult to bend the signal line in differential driving is as follows. In the semiconductor MZ optical modulator with the capacity loading structure, the signal line is as thick as about 100 µm. Hence, when two signal lines of a differential configuration are bent, the electrical length difference of signals is generated between the two signal lines. Due to this electrical length difference, the frequency characteristic of the differential mode degrades, or a common mode and a mixed mode, which are causes of noise, are excited. Hence, a structure capable of bending signal lines of a differential configuration without exciting the common mode and without degrading the frequency characteristic of the differential mode is necessary.

It is also possible to connect a modulator of a single-phase driving type to a driver to perform differential (SS) driving, as in non-patent literature 4. In this case, however, a common mode cannot propagate through a high-frequency line of the semiconductor MZ optical modulator. There is a concern that a common mode is totally reflected between the driver and the semiconductor MZ optical modulator, and this may undesirably cause crosstalk or the like and degrade the frequency characteristic or the driving force of the driver.

RELATED ART LITERATURE

Patent Literature

Non-Patent Literature 1: L. Morl et al., "A travelling wave electrode Mach-Zehnder 40 Gb/s demultiplexer based on strain compensated GaInAs/AlInAs tunnelling barrier MQW. structure", 1998 International Conference on Indium Phosphide and Related Materials, pp. 403-406, 1998

Non-Patent Literature 2: H. N. Klein et al., "1.55 µm Mach-Zehnder Modulators on InP for optical 40/80 Gbit/s transmission networks", OFC2006, pp. 171-173, 2006

Non-Patent Literature 3: K. Prosyk et al., "Travelling Wave Mach-Zehnder Modulators", IPRM2013, MoD 3-1, 2013

Non-Patent Literature 4: S. Lange et al., "Low Power InP-Based Monolithic DFB-Laser IQ Modulator With SiGe Differential Driver for 32-GBd QPSK Modulation", JOURNAL OF LIGHTWAVE TECHNOLOGY, VOL. 34, NO. 8, Apr. 15, 2016.

SUMMARY

Problem to be Solved by Embodiments of the Invention

Embodiments of the present invention have been made to solve the above-described problem, and has as its object to provide a semiconductor Mach-Zehnder optical modulator capable of solving degradation of the high-frequency characteristic of the modulator and having an excellent transmission characteristic by suppressing characteristic degradation caused by a phase difference in a differential mode at a bent portion and induction of a common mode that occurs due to the bent portion, which are problematic in a conventional structure, in a high-frequency wiring necessary for connecting to the terminal resistor of a signal line output terminal in a differential driving type semiconductor Mach-Zehnder optical modulator having a capacity loading structure, and an IQ modulator.

Means of Solution to the Problem

According to embodiments of the present invention, there is provided a semiconductor Mach-Zehnder optical modulator comprising a first arm waveguide and a second arm waveguide, both formed on a substrate, and a first input-side lead line formed on a dielectric layer on the substrate and having one end to which a modulation signal is input, a second input-side lead line formed on the dielectric layer adjacent to the first input-side lead line and having one end to which a signal complementary to the modulation signal is input, a first phase modulation electrode line and a second phase modulation electrode line, both formed on the dielectric layer, and one-end sides of the first phase modulation electrode line and the second phase modulation electrode line being connected to other-end sides of the first input-side lead line and the second input-side lead line, respectively, a first output-side lead line and a second output-side lead line, both formed on the dielectric layer, and one-end sides of the first output-side lead line and the second output-side lead line being connected to other-end sides of the first phase modulation electrode line and the second phase modulation electrode line, respectively, a first electrode and a second electrode, which are configured to apply the modulation signals propagating through the first phase modulation electrode line and the second phase modulation electrode line to the first arm waveguide and the second arm waveguide, respectively, a first ground line formed on the dielectric layer along a propagation direction of the modulation signal and in an outside of the first input-side lead line, the first phase modulation electrode line and the first output-side lead line, a second ground line formed on the dielectric layer along the propagation direction of the modulation signal and in an outside of the second input-side lead line, the second phase modulation electrode line and the second output-side lead line, and terminal resistors connected to other-end sides of the first output-side lead line and the second output-side lead line, wherein the first phase modulation electrode line and the second phase modulation electrode line are formed along the first arm waveguide and the second arm waveguide and the first output-side lead line and the second output-side lead line are bent in a direction crossing an extending direction of the first arm waveguide and the second arm waveguide in a plane of the dielectric layer and connected to the terminal resistors.

Effect of Embodiments of the Invention

According to embodiments of the present invention, the first and second phase modulation electrode lines are formed along the first and second arm waveguides, and the first and second output-side lead lines are bent in the direction crossing the extending direction of the first and second arm waveguides in the plane of the dielectric layer and connected to the terminal resistors. It is therefore possible to implement a semiconductor Mach-Zehnder optical modulator that can solve the degradation of the high-frequency characteristic as the problem in the conventional structure and have a broadband and is excellent in connection to a driver.

DETAILED DESCRIPTION OF ILLUSTRATIVE EMBODIMENTS

First Embodiment

Figure 1:
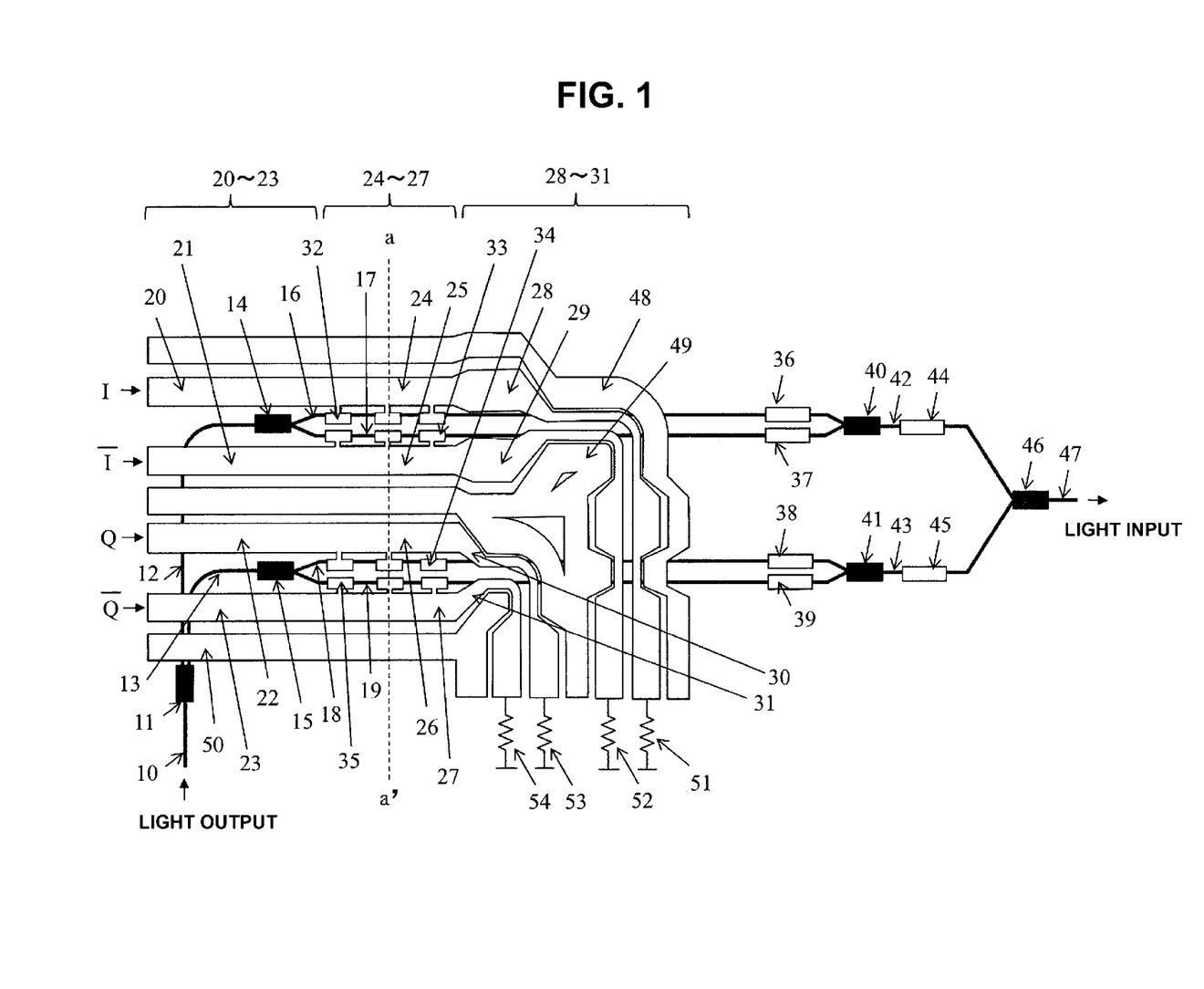
FIG. 1 is a plan view showing the configuration of an IQ modulator according to the first embodiment of the present invention.

An embodiment of the present invention will now be described with reference to the accompanying drawings. FIG. 1 is a plan view showing the configuration of an IQ modulator according to the first embodiment of the present invention. The IQ modulator includes an input waveguide 10, a 1×2 MMI coupler 11 that demultiplexes light propagating through the input waveguide 10 into two systems, waveguides 12 and 13 that guide the two light components demultiplexed by the 1×2 MMI coupler 11, a 1×2 MMI coupler 14 that demultiplexes light propagating through the waveguide 12 into two systems, a 1×2 MMI coupler 15 that demultiplexes light propagating through the waveguide 13 into two systems, waveguides 16 and 17 (first and second arm waveguides) that guide the two light components demultiplexed by the 1×2 MMI coupler 14, waveguides 18 and 19 (first and second arm waveguides) that guide the two light components demultiplexed by the 1×2 MMI coupler 15, input-side lead lines 20 and 21 (first and second input-side lead lines) made of a conductor and configured to apply I modulation signals to the waveguides 16 and 17, input-side lead lines 22 and 23 (first and second input-side lead lines) made of a conductor and configured to apply Q modulation signals to the waveguides 18 and 19, phase modulation electrode lines 24 and 25 (first and second phase modulation electrode lines) made of a conductor and connected to the input-side lead lines 20 and 21, phase modulation electrode lines 26 and 27 (first and second phase modulation electrode lines) made of a conductor and connected to the input-side lead lines 22 and 23, output-side lead lines 28 and 29 (first and second output-side lead lines) made of a conductor and connected to the phase modulation electrode lines 24 and 25, output-side lead lines 30 and 31 (first and second output-side lead lines) made of a conductor and connected to the phase modulation electrode lines 26 and 27, electrodes 32 and 33 (first and second electrodes) made of a conductor and configured to apply the I modulation signals supplied from the phase modulation electrode lines 24 and 25 to the waveguides 16 and 17, and electrodes 34 and 35 (first and second electrodes) made of a conductor and configured to apply the Q modulation signals supplied from the phase modulation electrode lines 26 and 27 to the waveguides 18 and 19.

The IQ modulator further includes phase adjustment electrodes 36 to 39 made of a conductor and configured to adjust the phases of the modulated signal light components propagating through the waveguides 16 to 19, a 2×1 MMI coupler 40 that multiplexes the signal light components of two systems propagating through the waveguides 16 and 17, a 2×1 MMI coupler 41 that multiplexes the signal light components of two systems propagating through the waveguides 18 and 19, a waveguide 42 that guides the output light from the 2×1 MMI coupler 40, a waveguide 43 that guides the output light from the 2×1 MMI coupler 41, phase adjustment electrodes 44 and 45 made of a conductor and configured to adjust the phases of the signal light components propagating through the waveguides 42 and 43, a 2×1 MMI coupler 46 that multiplexes the signal light components of two systems propagating through the waveguides 42 and 43, an output waveguide 47, a ground line 48 made of a conductor and disposed in an outside of the input-side lead line 20, the phase modulation electrode line 24, and the output-side lead line 28, a ground line 49 made of a conductor and disposed between the input-side lead line 21, the phase modulation electrode line 25, and the output-side lead line 29 and the input-side lead line 22, the phase modulation electrode line 26, and the output-side lead line 30, a ground line 50 made of a conductor and disposed in an outside of the input-side lead line 23, the phase modulation electrode line 27, and the output-side lead line 31, and terminal resistors 51 to 54 connected to the end portions of the output-side lead lines 28 to 31.

Figure 2:
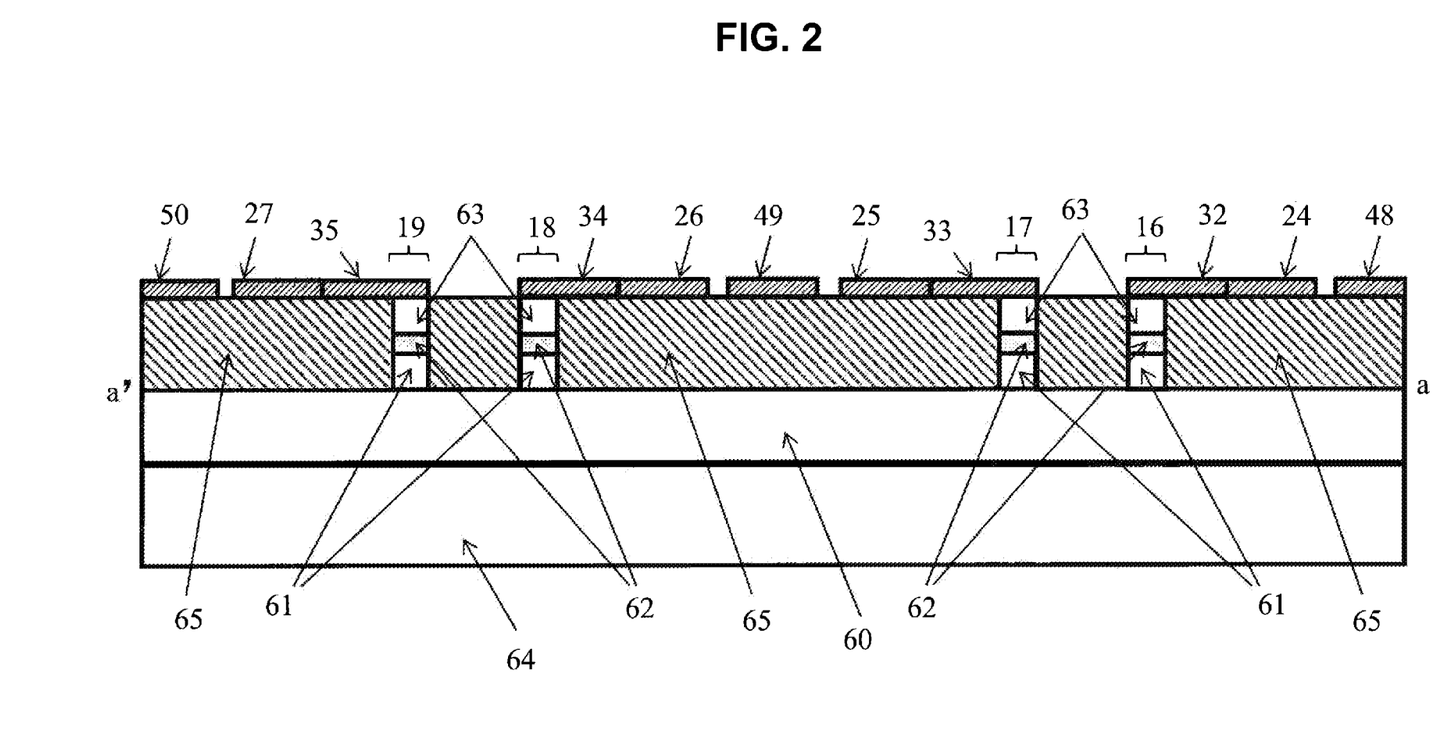
FIG. 2 is a sectional view of the IQ modulator according to the first embodiment of the present invention.

FIG. 2 is a sectional view of the IQ modulator according to this embodiment taken along a line a-a'. Referring to FIG. 2, reference numeral 60 denotes an n-InP layer; 61, a lower cladding layer made of InP; 62, a semiconductor core layer; 63, an upper cladding layer made of InP; 64, an SI-InP substrate; and 65, a dielectric layer formed on the n-InP layer 60.

As shown in FIG. 2, the input-side lead lines 20 to 23, the phase modulation electrode lines 24 to 27, the output-side lead lines 28 to 31, and the ground lines 48 to 50 are formed on the dielectric layer 65.

These high-frequency line patterns will be described next in more detail. A high-frequency line pattern according to this embodiment includes, as a basic structure, a GSSG (Ground Signal Signal Ground) differential coplanar line, which comprises two signal lines and two ground lines, both formed on the dielectric layer 65 made of a low-k material.

In this embodiment, a semiconductor MZ optical modulator using an I modulation signal as an input and a semiconductor MZ optical modulator using a Q modulation signal as an input are juxtaposed on the substrate, and the high-frequency line pattern of the semiconductor MZ optical modulator on the I modulation signal side and the high-frequency line pattern of the semiconductor MZ optical modulator on the Q modulation signal side share the ground line 49 at the center.

The signal lines are formed by three portions, that is, the portion of the input-side lead lines 20 to 23, the portion of the phase modulation electrode lines 24 to 27, and the portion of the output-side lead lines 28 to 31, and all the portions form a differential line structure (GSSG configuration) with impedance matching. Since the differential line configuration is formed, the modulator can be driven by a differential input signal (differential driver) with a high energy efficiency.

An I modulation signal is input from a differential driver (not shown) formed on the SI-InP substrate 64 to the input-side lead line 20, and an I modulation signal (bar I) complementary to that is input from the differential driver to the input-side lead line 21. Similarly, a Q modulation signal is input from the differential driver to the input-side lead line 22, and a Q modulation signal (bar Q) complementary to that is input from the differential driver to the input-side lead line 23.

End portions of the output-side lead lines 28 to 31 are terminated by the terminal resistors 51 to 54.

One end (the left end portion in FIG. 1) of each of the ground lines 48 to 50 is connected to the ground of the differential driver.

The 1×2 MMI coupler 14, the waveguides 16 and 17, the input-side lead lines 20 and 21, the phase modulation electrode lines 24 and 25, the output-side lead lines 28 and 29, the electrodes 32 and 33, and the 2×1 MMI coupler 40 constitute the semiconductor MZ optical modulator on the I modulation signal side. The semiconductor MZ optical modulator modulates the phases of light components propagating through the waveguides 16 and 17 in accordance with the I modulation signals applied from the electrodes 32 and 33 to the waveguides 16 and 17.

Similarly, the 1×2 MMI coupler 15, the waveguides 18 and 19, the input-side lead lines 22 and 23, the phase modulation electrode lines 26 and 27, the output-side lead lines 30 and 31, the electrodes 34 and 35, and the 2×1 MMI coupler 41 constitute the semiconductor MZ optical modulator on the Q modulation signal side. The semiconductor MZ optical modulator modulates the phases of light components propagating through the waveguides 18 and 19 in accordance with the Q modulation signals applied from the electrodes 34 and 35 to the waveguides 18 and 19.

The 2×1 MMI coupler 40 multiplexes the modulated signal light components propagating through the waveguides 16 and 17. The 2×1 MMI coupler 41 multiplexes the modulated signal light components propagating through the waveguides 18 and 19. By applying voltages to the phase adjustment electrodes 44 and 45, phase adjustment can be performed such that the phase difference between the I-side signal light output from the 2×1 MMI coupler 40 and the Q-side signal light output from the 2×1 MMI coupler 41 becomes 90°.

The 2×1 MMI coupler 46 multiplexes the I-side signal light propagating through the waveguide 42 and the Q-side signal light propagating through the waveguide 43, thereby obtaining an IQ-modulated optical signal. In this embodiment, an IQ modulator can be implemented in this way.

Characteristic configurations of this embodiment will sequentially be described next. The phase modulation electrode lines 24 to 27 are disposed in parallel to the waveguides 16 to 19 that constitute the semiconductor MZ optical modulators.

The input-side lead lines 20 to 23 connected to the phase modulation electrode lines 24 to 27 need to be formed on the same lines as the phase modulation electrode lines 24 to 27. In addition, the structure preferably has no bending at all. This is because in the input-side lead lines 20 to 23, if bending occurs in the differential line structure, a common mode may occur due to the influence of a phase difference caused by the bent portion, and accordingly, the differential transmission characteristic may largely degrade, a resonance may occur, or a signal may be reflected by the bent portion and returned to the driver side to largely degrade the driving force of the driver.

Also, if bending occurs in the input-side lead lines 20 to 23, the line length increases as compared to a linear line, and this increases a propagation loss and also generates a bending loss. For this reason, the high-frequency characteristic of a differential signal degrades. In particular, the loss in the input-side lead lines 20 to 23 directly causes degradation of the modulation band. Hence, to implement a boarder band, it is important to minimize the loss in the input-side lead lines 20 to 23.

To minimize the loss in the input-side lead lines 20 to 23, it is necessary not only to form the input-side lead lines 20 to 23 on the same lines as the phase modulation electrode lines 24 to 27, as described above, but also to optimize the arrangement of the waveguides 16 to 19, the input-side lead lines 20 to 23, and the phase modulation electrode lines 24 to 27.

For example, with the arrangement as in this embodiment, the lengths of the input-side lead lines 20 to 23 can be shortest. In this embodiment, the input waveguide 10 and the 1×2 MMI coupler 11 are formed such that the light propagating direction (the vertical direction in FIG. 1) of the input waveguide 10 and the light input/output direction (the vertical direction in FIG. 1) of the 1×2 MMI coupler 11 become orthogonal to the extending direction (the horizontal direction in FIG. 1) of the waveguides 16 to 19, and the 1×2 MMI couplers 14, 15, and the 2×1 MMI couplers 40, 41, and 46 are formed such that the input/output direction (the horizontal direction in FIG. 1) of the 1×2 MMI couplers 14, 15, and the 2×1 MMI couplers 40, 41, and 46 becomes the same as the extending direction of the waveguides 16 to 19. This forms the waveguide patterns in an L-shaped layout.

According to this layout, the lengths of the input-side lead lines 20 to 23 can be set to 700 μm or less. The lengths can be made shorter by about 1 mm as compared to a conventional configuration described in a literature "N. Kono et al., "Compact and Low Power DP-QPSK Modulator Module with InP-Based Modulator and Driver ICs", OFC2013, OW1G.2, 2013".

The phase modulation electrode lines 24 to 27 will be described next. The phase modulation electrode lines 24 to 27 and the electrodes 32 to 35 connected to these have a differential capacity loading structure (GSSG configuration) that is excellent in impedance matching and speed matching between a microwave and an optical wave. That is, the ground line 48, the phase modulation electrode line 24 to which the I modulation signal is input, the electrode 32 to which the I modulation signal is supplied from the phase modulation electrode line 24, the electrode 33 to which the signal (bar I) complementary to the I modulation signal is input, the phase modulation electrode line 25 that supplies the signal to the electrode 33, the ground line 49, the phase modulation electrode line 26 to which the Q modulation signal is input, the electrode 34 to which the Q modulation signal is supplied from the phase modulation electrode line 26, the electrodes 32 to 35 to which the signal (bar Q) complementary to the Q modulation signal is input, the phase modulation electrode line 27 that supplies the signal to the electrode 35, and the ground line 50 are juxtaposed.

When the number, the interval, and the length of the electrodes 32 to 35 in the capacity loading portion, which are branched from the phase modulation electrode lines 24 to 27 serving as main lines and periodically formed, are optimally designed, the addition amounts of capacities to the phase modulation electrode lines 24 to 27 can freely be designed. Hence, the impedances of the phase modulation electrode lines 24 to 27 and the speeds of microwaves propagating through the phase modulation electrode lines 24 to 27 can be designed to arbitrary values.

It is therefore possible to form an electrode configuration capable of simultaneously implementing impedance matching and speed matching between a microwave and an optical wave and implementing a broadband operation of the modulator at 30 GHz or more. In addition, to cause the semiconductor MZ optical modulator to perform the broadband operation, the electrodes 32 to 35 need to be designed such that these can be regarded as traveling wave electrodes. For this reason, the periods of the electrodes 32 to 35 on a signal basis need to be set to at least ¼ or less and, ideally, ⅛ or less of a guide wavelength $\lambda_{eff}$ of modulation signals of the maximum frequency, which propagate through the phase modulation electrode lines 24 to 27 and the electrodes 32 to 35, such that the periods can be regarded as distribution constants.

To periodically arrange the electrodes 32 to 35 along the extending direction of the waveguides 16 to 19, a Bragg frequency also needs to be considered in general. In this embodiment, however, since the Bragg frequency is a frequency on the high frequency side as compared to the frequency corresponding to the above-described guide wavelength, if the above-described condition to set the periods of the electrodes 32 to 35 on a signal basis to ¼ or less (ideally, ⅛ or less) of the guide wavelength $\lambda_{eff}$ is satisfied, the Bragg frequency need not be taken into consideration.

Figure 3:
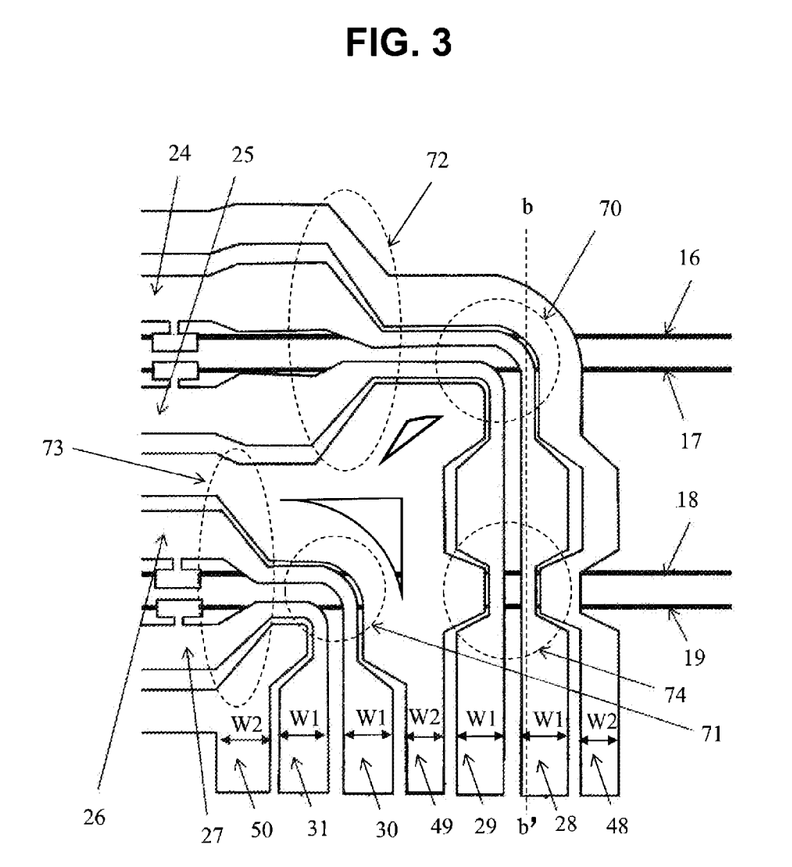
FIG. 3 is an enlarged plan view of the portion of the output-side lead lines of the IQ modulator according to the first embodiment of the present invention.

The output-side lead lines 28 to 31 will be described next. FIG. 3 is an enlarged plan view of the portion of the output-side lead lines 28 to 31. As for the structure, in the plane of the dielectric layer 65 (in the sheet surface of FIG. 3), the output-side lead lines 28 to 31 are bent in a direction crossing (in this embodiment, a direction orthogonal to) the extending direction of the waveguides 16 to 19 (the extending direction of the input-side lead lines 20 to 23 and the phase modulation electrode lines 24 to 27). Since the high-frequency line pattern according to this embodiment has a GSSG differential line structure, as described above, how to bend the output-side lead lines 28 to 31 is important.

For example, if the width of the output-side lead lines 28 to 31 is set to a width for obtaining arbitrary impedances, and the output-side lead lines 28 to 31 having the width are bent at a right angle, electrical length differences are generated between the output-side lead lines 28 and 29 and between the output-side lead lines 30 and 31 of the differential configuration, and a large phase difference is generated. Due to the phase difference and asymmetry of bending, a common mode occurs, or the high-frequency characteristic of the differential mode degrades. This undesirably degrades the modulation band or degrades the transmission characteristic.

In this embodiment, the output-side lead lines 28 to 31 are formed in a predetermined width W1 corresponding to a desired impedance, and the width of the output-side lead lines 28 to 31 is gradually reduced in tapered portions (72 and 73 in FIG. 3) having a length of about 50 μm from positions closer to the phase modulation electrode lines 24 to 27 than bent portions (70 and 71 in FIG. 3) such that the width of the output-side lead lines 28 to 31 in the bent portions 70 and 71 becomes narrower than the predetermined width W1. Also, the distance between the output-side lead lines 28 and 29 and the distance between the output-side lead lines 30 and 31 are made shorter than the distance between the phase modulation electrode lines 24 and 25 and the distance between the phase modulation electrode lines 26 and 27. Furthermore, in the bent portions 70 and 71, the distance between the output-side lead line 28 and the ground line 48, the distance between the output-side lead line 29 and the ground line 49, the distance between the output-side lead line 30 and the ground line 49, and the distance between the output-side lead line 31 and the ground line 50 are made shorter than the distances between the output-side lead lines and the ground lines in other portions. However, at this time, the widths of the ground lines 48 to 50 are equal in the bent portions and the linear portions, unlike the width of the output-side lead lines 28 to 31. This is because a satisfactory common mode characteristic is obtained, and a crosstalk characteristic is guaranteed.

In this embodiment, the line width is decreased only in a very small section much smaller than the wavelength (¼ or less). Hence, in both the differential mode and the common mode, even if the impedances of the output-side lead lines 28 to 31 are made high, the output-side lead lines 28 to 31 can be bent without any characteristic degradation caused by impedance mismatching.

When the width of the output-side lead lines 28 to 31 is reduced in the bent portions 70 and 71, the electrical length difference and the phase difference between the output-side lead lines 28 and 29 and the electrical length difference and the phase difference between the output-side lead lines 30 and 31 can be made sufficiently small. It is therefore possible to suppress occurrence of the common mode an degradation of the high-frequency characteristic of the differential mode.

In this embodiment, the transmission characteristic (Sdd21) can be improved by, for example, about 0.5 dB at 50 GHz, as compared to the conventional configuration in which the output-side lead lines are wired in a predetermined width. Also, Sdc21 representing conversion from the differential mode to the common mode (induction of the common mode) can be improved by, for example, about 10 dB.

In addition, to prevent characteristic degradation of the common mode, a width W2 of the ground lines 48 to 50 is preferably constant to minimize the asymmetry of the structure.

Also, when clothoid curves are employed as the tracks of the edges of the output-side lead lines 28 to 31 in the bent portions 70 and 71, the high-frequency characteristic can further be improved. When a clothoid curve is employed, for example, the differential reflection characteristic (Sdd11) can be improved by several dB, as compared to a normal curve.

In this embodiment, the width of the output-side lead lines 28 to 31 in the bent portions 70 and 71 is made narrower than the predetermined width W1 of linear portions where impedance matching is obtained, as described above. However, if the propagation distances in the bent portions 70 and 71 are too long, the bent portions 70 and 71 may serve as signal reflecting points due to the influence of slight impedance mismatching caused by making the width of the output-side lead lines 28 to 31 narrower, and the high-frequency characteristic may degrade. To suppress the influence of impedance mismatching, the propagation lengths in the bent portions 70 and 71 are preferably set to ¼ or less and, if possible, ⅛ or less of the guide wavelength $\lambda_{eff}$. Also, from the viewpoint of reducing the lengths, the propagation lengths in the tapered portions 72 and 73 are preferably 50 μm or less.

Figure 4:
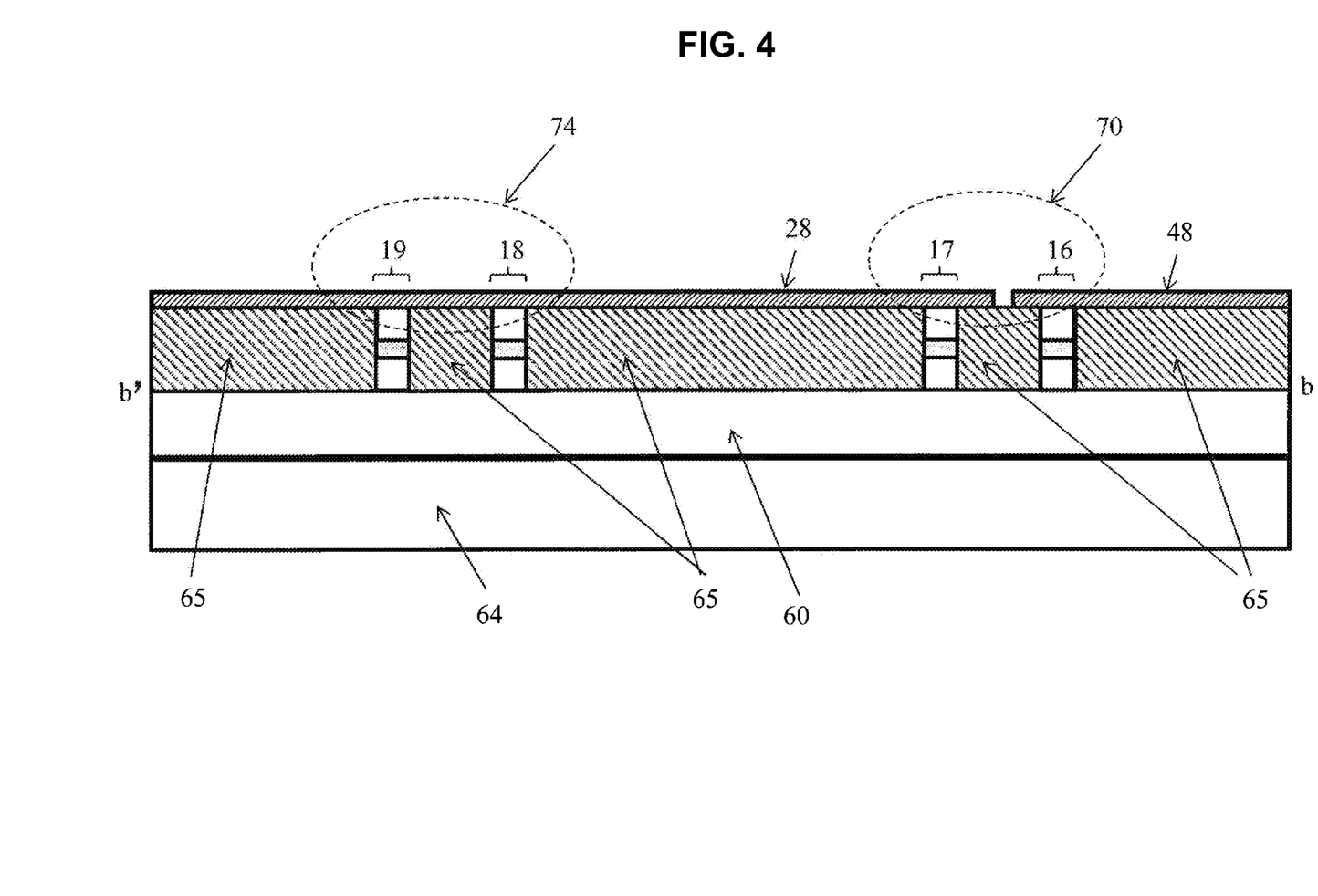
FIG. 4 is a sectional view of the bent portions of the output-side lead lines of the IQ modulator according to the first embodiment of the present invention.

Additionally, the output-side lead lines 28 to 31 are basically formed on the dielectric layer 65. However, when the output-side lead lines 28 to 31 are bent, portions where the output-side lead lines 28 to 31 are formed on the waveguides 16 to 19 are generated, as shown in FIG. 4 showing a section taken along a line b-b' in FIG. 3. That is, the output-side lead lines 28 to 31 cross over a semiconductor whose dielectric constant is about four times larger than that of benzocyclobutene that is an example of the low-k material forming the dielectric layer 65. For this reason, if the output-side lead lines 28 to 31 are formed on the waveguides 16 to 19 while maintaining the width on the dielectric layer 65, the impedances of the output-side lead lines 28 to 31 may largely lower, and impedance mismatching may occur.

Even in a cross portion (74 in FIGS. 3 and 4) other than the bent portions 70 and 71, the width of the output-side lead lines 28 to 31 may be made smaller than the predetermined width W1 corresponding to a desired impedance, as in the bent portions 70 and 71, and the distance between the output-side lead lines 28 and 29, the distance between the output-side lead line 28 and the ground line 48, and the distance between the output-side lead line 29 and the ground line 49 may be decreased.

With this structure, in the portions where the output-side lead lines 28 to 31 cross over the waveguides 16 to 19, the possibility that the impedances of the output-side lead lines 28 to 31 largely lower, and impedance mismatching occurs can be reduced. However, the structures of the output-side lead lines 28 to 31 and the ground lines 48 and 49 in the crossing portions as described above are not essential components of the present invention. If the area where the output-side lead lines 28 to 31 cross over the waveguides 16 to 19 is small, the influence of impedance mismatching is not observed. Hence, the structures are unnecessary.

Also, in this embodiment, the distance between the output-side lead lines 28 and 29 and the distance between the output-side lead lines 30 and 31 are shortened as compared to the portions of the phase modulation electrode lines 24 to 27. This makes it possible to obtain a structure capable of increasing electrical confinement and prevent electromagnetic wave leakage in the substrate direction or substrate resonance.

In addition, the end portions of the output-side lead lines 28 to 31 are connected to the terminal resistors 51 to 54 that satisfy desired differential impedances and common mode impedances and are differentially terminated.

Figure 5:
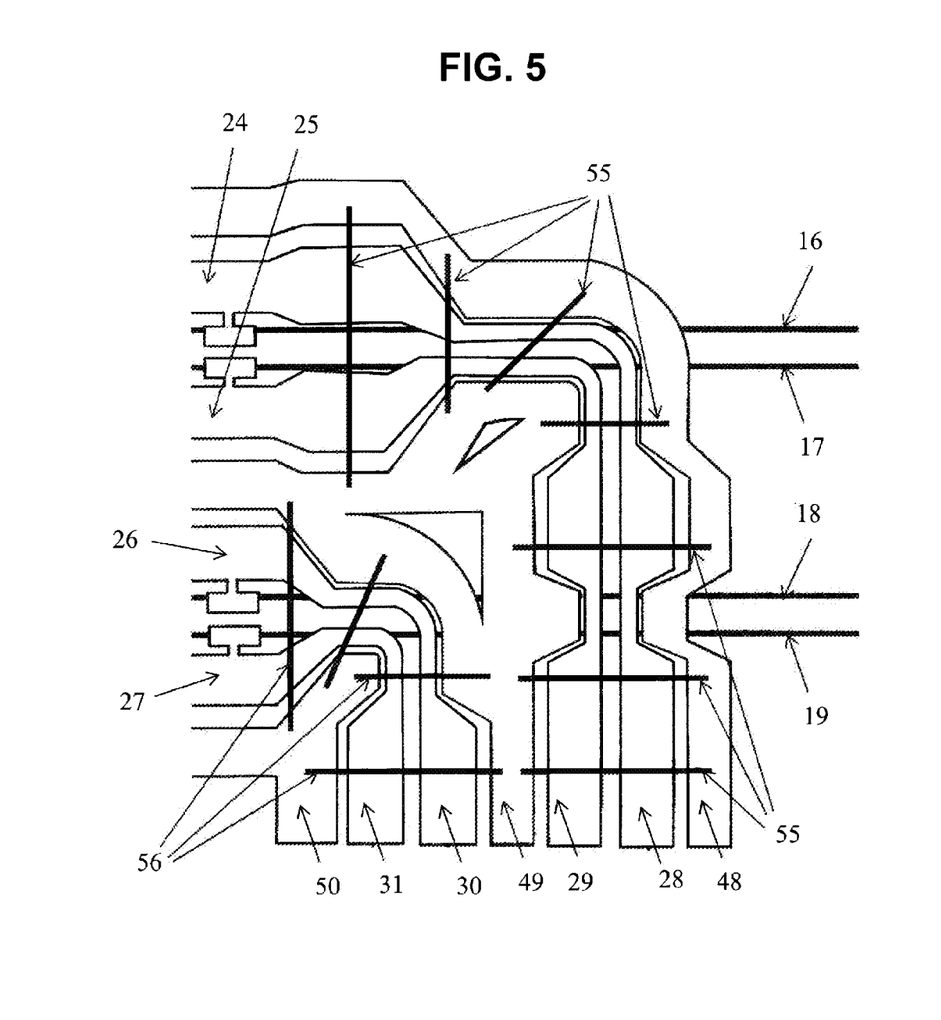
FIG. 5 is a plan view showing wires that connect ground lines in the first embodiment of the present invention.

Also, as shown in FIG. 5, wires 55 and 56 that electrically connect the ground lines 48 to 50 are preferably provided in actuality. The wires 55 connect the ground lines 48 and 49. The wires 56 connect the ground lines 49 and 50. If the wires 55 and 56 are absent, the potentials of the ground lines 48 to 50 are not stable and fluctuate. Hence, resonance occurs at an arbitrary frequency depending on the propagation length. It is therefore difficult to implement a broadband modulator. To suppress the resonance, the wires 55 and 56 that connect the ground lines 48 to 50 are preferably provided at a period much shorter than the signal wavelength along the signal propagation direction, that is, at a period ¼ to ⅛ or less of the guide wavelength $\lambda_{eff}$.

In the example shown in FIG. 5, the wires 55 and 56 are provided only in the portions of the output-side lead lines 28 to 31. However, in the portions of the input-side lead lines 20 to 23 and the phase modulation electrode lines 24 to 27 as well, the wires 55 and 56 are preferably similarly provided between the ground lines 48 to 50.

When the wires 55 and 56 are provided, a broadband modulator in which the potentials of the ground lines 48 to 50 on both sides of the input-side lead lines 20 to 23, the phase modulation electrode lines 24 to 27, and the output-side lead lines 28 to 31, and the resonance of the potentials of the ground lines 48 to 50 can be suppressed can be implemented. If the wires 55 and 56 are provided at a period longer than ¼ to ⅛ of the guide wavelength $\lambda_{eff}$, the amount of ripple can be reduced. However, it is impossible to completely suppress the resonance of the potentials of the ground lines 48 to 50.

Figure 6:
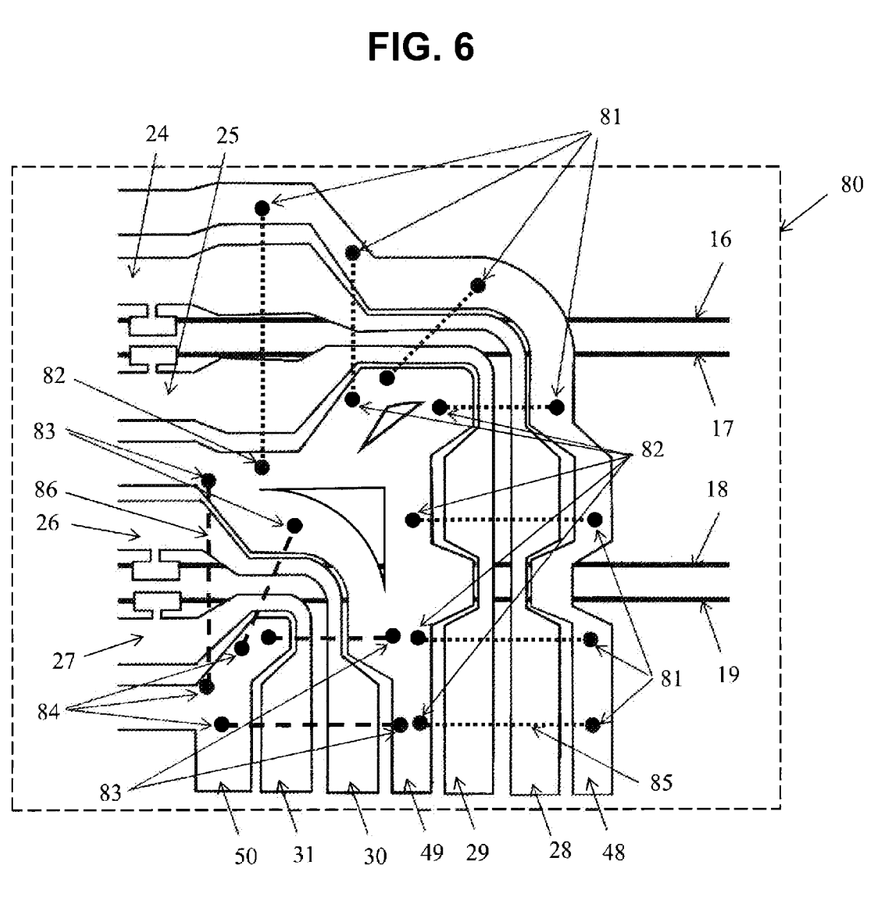
FIG. 6 is a plan view showing ground vias that connect the ground lines in the first embodiment of the present invention.

Alternatively, as shown in FIG. 6, the potentials of the ground lines 48 to 50 may be stabilized by connecting the ground lines 48 to 50 via a ground electrode 80 provided on the lower surface of the semiconductor substrate (SI-InP substrate 64) and ground vias 81 to 84 formed by processing the semiconductor substrate. The ground vias 81 connect the ground line 48 and the ground electrode 80. The ground vias 82 and 83 connect the ground line 49 and the ground electrode 80. The ground vias 84 connect the ground line 50 and the ground electrode 80.

In FIG. 6, to facilitate understanding of the configuration, lines 85 that connect the pairs of ground vias 81 and 82 periodically provided on the ground lines 48 and 49 at a period of ¼ to ⅛ or less of the guide wavelength $\lambda_{eff}$ are illustrated. Similarly, lines 86 that connect the pairs of ground vias 83 and 84 periodically provided on the ground lines 49 and 50 at a period of ¼ to ⅛ or less of the guide wavelength $\lambda_{eff}$ are illustrated.

In FIG. 6, the ground vias 81 to 84 are provided only in the portions of the output-side lead lines 28 to 31, as in FIG. 5. However, in the portions of the input-side lead lines 20 to 23 and the phase modulation electrode lines 24 to 27 as well, the ground vias 81 to 84 are preferably provided between the ground lines 48 to 50.

Note that in the example shown in FIG. 6, the ground electrode 80 is formed on the lower surface of the semiconductor substrate. However, a dielectric layer may be formed on the structure shown in FIGS. 1 to 4, and the ground electrode 80 may be formed on the dielectric layer.

Second Embodiment

Figure 7:
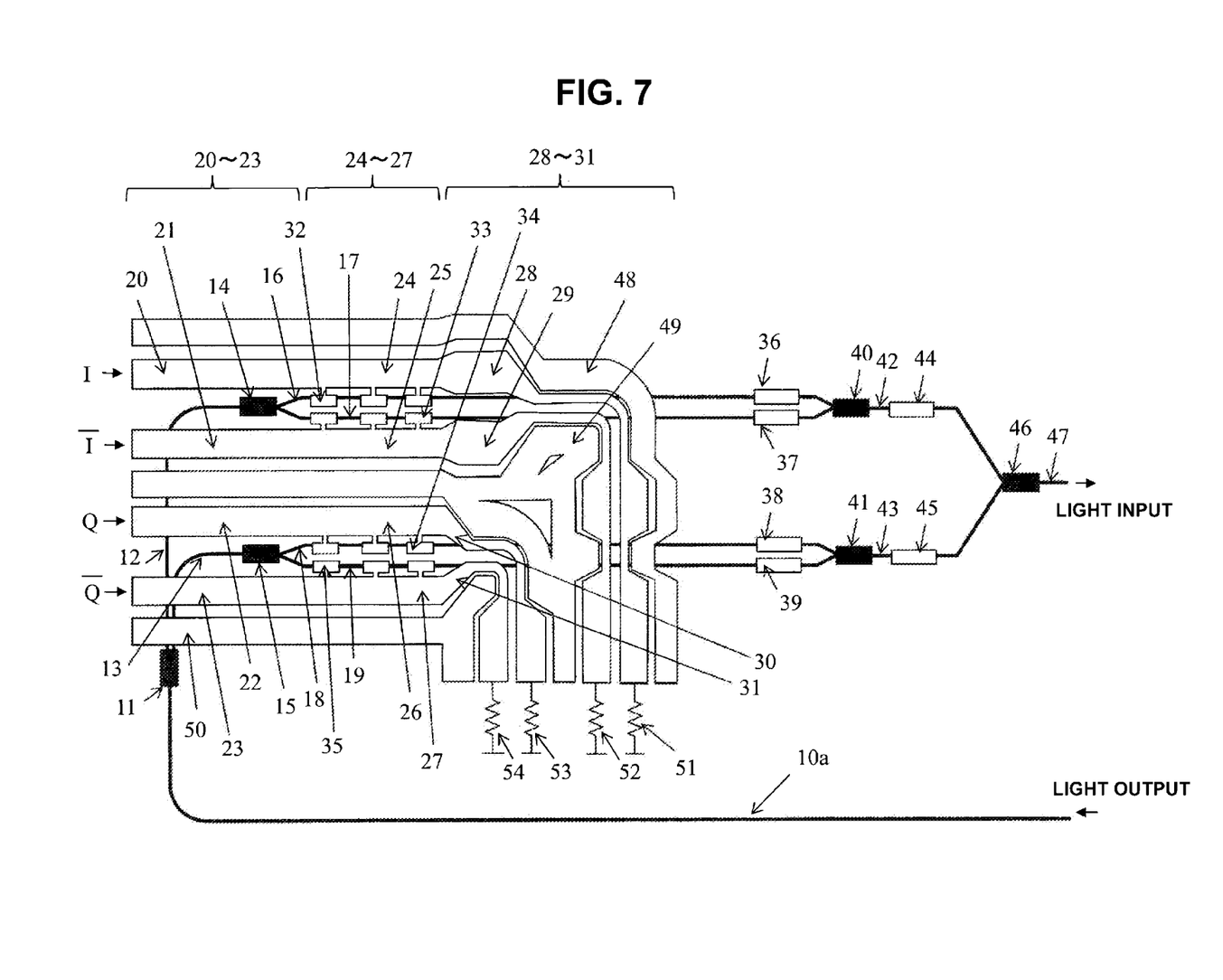
FIG. 7 is a plan view showing the configuration of an IQ modulator according to the second embodiment of the present invention.

The second embodiment of the present invention will be described next. FIG. 7 is a plan view showing the configuration of an IQ modulator according to the second embodiment of the present invention, and the same reference numerals as in FIG. 1 denote the same components. In the first embodiment, the light propagation direction of the input waveguide 10 is orthogonal to the extending direction (the horizontal direction in FIG. 1) of the waveguides 16 to 19.

However, in this embodiment, light enters an input waveguide boa from a direction parallel to the extending direction of waveguides 16 to 19, and the input waveguide boa is bent before connecting to a 1×2 MMI coupler 11. Hence, a configuration in which the waveguide pattern has a U-shaped layout is obtained. The rest of the configuration is the same as described in the first embodiment.

In this embodiment as well, the lengths of input-side lead lines 20 to 23 can be set to 700 μm or less. The lengths can be made shorter by about 1 mm as compared to a conventional configuration described in a literature "N. Kono et al., "Compact and Low Power DP-QPSK Modulator Module with InP-Based Modulator and Driver ICs", OFC2013, OW1G.2, 2013".

Note that in the first and second embodiments, the waveguides 16 to 19 of the semiconductor MZ optical modulator each have a structure formed by sequentially stacking the lower cladding layer 61 made of InP, the non-doped semiconductor core layer 62, and the upper cladding layer 63 made of InP on the SI-InP substrate 64. This also applies to the remaining waveguides 10, 10a, 12, 13, 42, 43, and 47.

The semiconductor core layer 62 functions as an optical waveguide layer and is made of a material such as, for example, InGaAsP or InGaAlAs. The semiconductor core layer 62 is preferably formed by a bulk layer of a quaternary mixed crystal with a single composition or a multiple quantum well layer. Alternatively, a structure obtained by forming, on the upper and lower sides of the multiple quantum well layer, light confinement layers whose bandgap is larger than that of the multiple quantum well layer and smaller than that of the lower cladding layer 61 and the upper cladding layer 63 may be used as the semiconductor core layer 62.

The bandgap wavelength of the bulk layer of a quaternary mixed crystal or the multiple quantum well layer is set such that the electrooptic effect effectively acts at the optical wavelength to be used, and light absorption is not problematic.

From the viewpoint of characteristics, when a desired impedance line is designed, the dielectric layer 65 can reduce the electrode loss, and is therefore preferably made of a low-k material such as, for example, polyimide or BCB, which is an organic material. Also, the present invention is not limited to an InP-based material, and, for example, a material system matching a GaAs substrate may be used.

One of the upper cladding layer 63 and the lower cladding layer 61 may be made of an n-type semiconductor, and the other may be made of a p-type semiconductor. It is also possible to employ a structure in which both the semiconductor core layer 62 and the lower cladding layer 61 are made of an n-type semiconductor, and a third p-type cladding layer is inserted between the upper cladding layer 63 and the semiconductor core layer 62 or between the lower cladding layer 61 and the semiconductor core layer 62.

INDUSTRIAL APPLICABILITY

Embodiments of the present invention can be applied to a semiconductor Mach-Zehnder optical modulator that modulates an optical signal by an electrical signal.

EXPLANATION OF THE REFERENCE NUMERALS AND SIGNS 10, 10a . . . input waveguide, 11, 14, 15 . . . 1×2 MMI coupler, 12, 13, 16-19, 42, 43 . . . waveguide, 20-23 . . . input-side lead line, 24-27 . . . phase modulation electrode line, 28-31 . . . output-side lead line, 32-35 . . . electrode, 36-39, 44, 45 . . . phase adjustment electrode, 40, 41, 46 . . . 2×1 MMI coupler, 47 . . . output waveguide, 48-50 . . . ground line, 51-54 . . . terminal resistors, 55, 56 . . . wire, 60 . . . n-InP layer, 61 . . . lower cladding layer, 62 . . . semiconductor core layer, 63 . . . upper cladding layer, 64 . . . SI-InP substrate, 65 . . . dielectric layer, 80 . . . ground electrode, 81-84 . . . ground via.

The invention claimed is:

1. A semiconductor Mach-Zehnder optical modulator comprising:
a first arm waveguide and a second arm waveguide both on a substrate;
a first input-side lead line on a dielectric layer and having one end to which a modulation signal is input, the dielectric layer being on the substrate;
a second input-side lead line on the dielectric layer, the second input-side lead line being adjacent to the first input-side lead line, the second input-side lead line having a first end to which a signal complementary to the modulation signal is input;
a first phase modulation electrode line and a second phase modulation electrode line both on the dielectric layer, the first phase modulation electrode line and the second phase modulation electrode line being along the first arm waveguide and the second arm waveguide, respectively, and a first end side of the first phase modulation electrode line and a first end side of the second phase modulation electrode line being connected to a second end side of the first input-side lead line and a second end side of the second input-side lead line, respectively;
a first output-side lead line and a second output-side lead line both on the dielectric layer, the first output-side lead line and the second output-side lead line being bent in a direction crossing an extending direction that the first arm waveguide and the second arm waveguide extends in a plane of the dielectric layer, and a first end side of the first output-side lead line and a first end side of the second output-side lead line being connected to a second end side of the first phase modulation electrode line and a second end side of the second phase modulation electrode line, respectively;
a first electrode and a second electrode configured to apply the modulation signals propagating through the first phase modulation electrode line and the second phase modulation electrode line to the first arm waveguide and the second arm waveguide, respectively; and a first ground line on the dielectric layer along a propagation direction of the modulation signal and disposed outside of the first input-side lead line, the first phase modulation electrode line, and the first output-side lead line, wherein each of the first output-side lead line and the second output-side lead line includes a first linear portion where impedance matching is obtained, and a first bent portion which is bent in the direction crossing the extending direction of the first arm waveguide and the second arm waveguide, wherein the first bent portion has a width narrower than a width of the first linear portion, and wherein a distance between the first bent portion of the first output-side lead line and the first ground line, and a distance between the first bent portion of the second output-side lead line and a second ground line are shorter than a distance between the first linear portion of the first output-side lead line and the first ground line, and a distance between the first linear portion of the second output-side lead line and the second ground line, respectively.

2. The semiconductor Mach-Zehnder optical modulator according to claim 1, wherein:

the first input-side lead line and the second input-side lead line are disposed on the same lines as the first phase modulation electrode line and the second phase modulation electrode line, respectively.

3. The semiconductor Mach-Zehnder optical modulator according to claim 1, further comprising a plurality of wires or ground vias configured to electrically connect the first ground line to the second ground line, wherein the plurality of wires or ground vias are provided at a period not more than ¼ of a guide wavelength of the modulation signals of a maximum frequency propagating through the first phase modulation electrode line and the second phase modulation electrode line.

4. The semiconductor Mach-Zehnder optical modulator according to claim 1, wherein:

each of the first output-side lead line and the second output-side lead line further includes a cross portion crossing over the first arm waveguide and the second arm waveguide;

the cross portion has a width narrower than a width of the first linear portion;

a distance between the first output-side lead line and the second output-side lead line is shorter than a distance between the first phase modulation electrode line and the second phase modulation electrode line; and a distance between the first ground line and the cross portion of the first output-side lead line and a distance between the second ground line and the cross portion of the second output-side lead line are shorter than a distance between the first ground line and the first linear portion of the first output-side lead line and a distance between the second ground line and the first linear portion of the second output-side lead line, respectively.

5. The semiconductor Mach-Zehnder optical modulator claim 1, wherein a planar track of an edge of each of the first output-side lead line and the second output-side lead line draws a clothoid curve.

6. The semiconductor Mach-Zehnder optical modulator according to claim 1, wherein each of the first ground line and the second ground line includes:

a second linear portion and a second bent portion, and wherein the second bent portion has the same width as the second linear portion in the first ground line and the second ground line.

7. The semiconductor Mach-Zehnder optical modulator according to claim 1, wherein each of the first electrode and the second electrode comprises a plurality of electrodes disposed along the extending direction of the first arm waveguide and the second arm waveguide at a period not more than ¼ of a guide wavelength of the modulation signals of a maximum frequency propagating through the first phase modulation electrode line and the second phase modulation electrode line.

* * * * *